(12) United States Patent
Chen

(10) Patent No.: US 8,801,809 B2
(45) Date of Patent: Aug. 12, 2014

(54) METHOD OF PRODUCING AN ALUMINUM SLUG ANODE

(75) Inventor: Singjang Chen, Beaverton, OR (US)

(73) Assignee: Biotronik CRM Patent AG (CH)

( * ) Notice: Subject to any disclaimer, the term of this patent is extended or adjusted under 35 U.S.C. 154(b) by 1046 days.

(21) Appl. No.: 12/773,421

(22) Filed: May 4, 2010

(65) Prior Publication Data

US 2010/0318142 A1 Dec. 16, 2010

Related U.S. Application Data

(60) Provisional application No. 61/187,303, filed on Jun. 16, 2009.

(51) Int. Cl.
*H01L 21/02* (2006.01)
*H01G 4/00* (2006.01)
*H01G 9/045* (2006.01)

(52) U.S. Cl.
CPC ..................................... *H01G 9/045* (2013.01)
USPC .................................. 29/25.02; 607/5; 216/6

(58) Field of Classification Search
None
See application file for complete search history.

(56) References Cited

U.S. PATENT DOCUMENTS

| | | | |
|---|---|---|---|
| 3,113,376 A | 12/1963 | Pflumm et al. | |
| 3,345,545 A | 10/1967 | Bourgault et al. | |
| 5,503,718 A * | 4/1996 | Kakizakai | 216/6 |
| 5,646,815 A * | 7/1997 | Owens et al. | 361/502 |
| 5,717,133 A * | 2/1998 | Wu et al. | 73/114.04 |
| 6,038,124 A | 3/2000 | Uchi et al. | |
| 6,721,170 B1 | 4/2004 | Evans et al. | |
| 7,342,774 B2 | 3/2008 | Hossick-Schott et al. | |
| 7,445,646 B1 * | 11/2008 | Strange et al. | 29/25.03 |
| 2003/0223178 A1 | 12/2003 | O'Phelan et al. | |
| 2005/0237697 A1 | 10/2005 | O'Phelan et al. | |
| 2006/0023400 A1 * | 2/2006 | Sherwood | 361/503 |
| 2008/0232032 A1 * | 9/2008 | Jones et al. | 361/509 |

FOREIGN PATENT DOCUMENTS

| | | |
|---|---|---|
| DE | 865155 C | 1/1953 |
| DE | 102004040088 A1 | 2/2006 |
| EP | 0851446 A2 | 7/1998 |

OTHER PUBLICATIONS

European Search Report (EP 10 15 7140.4-2214), Sep. 15, 2010.

* cited by examiner

*Primary Examiner* — Brian T Gedeon
(74) *Attorney, Agent, or Firm* — Craig A. Fieschko, Esq.; DeWitt Ross & Stevens S.C.

(57) ABSTRACT

An aluminum slug anode usable in capacitors is produced from multiple-stacked layers of aluminum foils. The foils are stacked (possibly after cutting them to have an area similar to the area desired for the anode), hot-pressed, sintered, and anodized to generate the anode. A contact in electrical communication with the foils is formed, as by welding a contact across at least some of the foils. A capacitor casing be formed by situating the anode within a casing which serves as a cathode, with the anode being wrapped in a dielectric such as separator paper.

30 Claims, 4 Drawing Sheets

METHOD OF PRODUCING AN ALUMINUM SLUG ANODE

CROSS-REFERENCE TO RELATED APPLICATIONS

This application claims priority under 35 USC §119(e) to U.S. Provisional Patent Application 61/187,303 filed Jun. 16, 2009, the entirety of which is incorporated by reference herein.

FIELD OF INVENTION

The invention relates to a method of producing an aluminum slug anode for use in capacitors, in particular in high voltage capacitors.

BACKGROUND OF THE INVENTION

Anodes for capacitors, especially capacitors utilizing aluminum as valve metal, are well known in the art. Bourgault et al. describe in U.S. Pat. No. 3,345,545 a capacitor with a solid porous anode. Evans et al. describe in U.S. Pat. No. 6,721,170 a basic capacitor design with a bulky anode that casing be made from either tantalum or aluminum. In U.S. Pat. No. 7,342,744 Hossick-Schott et al. describe a slug anode which casing be made from aluminum or tantalum. Also disclosed is the use of a cross-sectional density gradient.

In U.S. Pat. No. 3,113,376, Pflumm et al. describe an alloying process which involves brittle materials.

Although the prior art describes many possibilities for producing anodes for capacitors, there is still a need for anodes for capacitors with a high energy density for special applications such as, but not limited to, high voltage capacitors. Beside the well known applications like flashbulbs, these capacitors are of increasing interest due to its applications (or possible applications) in the automotive sector, in scientific equipment and in medical devices, like defibrillators or cardioverters-defibrillators. In implantable devices it is particularly useful to obtain a high energy density, which allows smaller or more efficient devices. Slug anodes are nowadays made from sintered powder, with tantalum powder being particularly dominant. The sintered porous materials used for anodes, mainly valve metals like tantalum or aluminum, exhibit a large effective surface area, which is necessary for the high energy density. Therefore tantalum and aluminum are prominent materials used for capacitors in implantable medical devices. Beside the slug anode configuration there are other configurations like stacked electrodes or rolled electrodes, which both lack either high energy density or the possibility for a compact design. The standard method for producing slug anodes from powder material is difficult to handle for aluminium, and thus has not been of use up to now. Therefore a method to overcome that problem, and to produce aluminum slug anodes for high energy density capacitors, is needed.

SUMMARY OF THE INVENTION

The present invention relates to aluminium slug anodes and capacitors with aluminium slug anodes, as well as production methods for producing aluminum slug anodes and capacitors with aluminum slug anodes.

One aspect of the invention is a method for producing an aluminum slug anode wherein etched aluminum foils are stacked in a multi-layer stack, and then hot pressed to the final is thickness of the desired aluminum slug anode. Following the hot pressing, the hot pressed multi-layer stack of aluminum foils is sintered, preferably (but not necessarily) in a reducing atmosphere. This production process utilizing hot pressed aluminum foils is easier to handle than the process with pressed aluminum powder. If the sintered and hot pressed multi-layer stacks do not have the desired shape, they can be cut after sintering, but also at earlier or later stages of the process. In a next step, the slug anode is provided with means for electrically contacting the slug anode. In another step, the aluminum slug anode is anodized. The foregoing process allows a simplified production of aluminum slug anodes for use in capacitors with a high energy density.

If in the following description a "sintering" or a "sinter" process is mentioned, it should be understood as referring to the heating of a sample, especially (but not restricted to) heating a sample in a reducing atmosphere to a desired temperature; holding it at that temperature for a predefined time or duration; cooling of the sample; and removal of the sample from the sinter furnace or other heat source.

The term "anodizing" should be understood as referring to the process of forming a dielectric oxide at the surface of the multi-layer, hot pressed, and sintered stack of aluminum foils.

"Electrically contacting" as mentioned above does not solely mean establishing an electrical contact via that the parts are in direct contact, but can also mean that the parts are joined securely with a low electric resistance, as it casing be achieved for example (but not restricted to) by welding, riveting, screwing, clamping, soldering or brazing.

The etched aluminum foils can be made from high purity aluminum foils as described below, or casing be provided as high voltage capacitor aluminum foils. The processes for etching aluminum foils such as, but not restricted to, electrochemical etching are well known by a person skilled in the art. High purity aluminum foil anodes can be etched in a chloride solution with DC, AC, or an alternation of DC and AC, or a concurrent DC and AC current. A fine surface etching as often used for low voltage foils is achieved mainly by AC electrolysis. A tunnel etching process as accomplished by DC electrolysis leads to foils usable for middle and high voltage applications. Further information can be found for example in Technical Notes CAT.8101 D "General description of Aluminium electrolytic capacitor", Nichicon Corporation (Japan). In a preferred version the method of producing an aluminum slug anode for a capacitor includes etched aluminum foils having an effective surface area between 4427 $cm^2/cc$ to 8854 $cm^2/cc$, wherein the effective surface area is the measured surface area per aluminum slug overall volume. Even more preferred is an effective surface area between 5534 $cm^2/cc$ and 6640 $cm^2/cc$. The surface area is measured using a BET surface analysing instrument (BET signifying Brunauer, Emmett and Teller, who developed the underlying theory for a method of determining the effective surface area).

In a preferred version one or more of the following parameters are used for the hot pressing process. The temperature during the hot pressing process is preferably between 350° C. and 500° C., most preferably between 390° C. and 410° C. The pressure for the hot pressing process of the multi-layer stack preferably ranges between 20 MPa and 40 MPa, most preferably between 25 MPa and 30 MPa. The time duration of pressing, starting with reaching and stabilization of a desired target temperature, preferably ranges between 1 minute and 10 minutes, most preferably between 2 minutes and 3 minutes. The hot pressing is preferably carried out in a reducing atmosphere. These parameters allow a hot pressing process which does not compromise the integrity of the porous foils.

In a further preferred version one or more of the following parameters are used for the sintering process. The temperature during the sintering process preferably ranges between 575° C. and 650° C., most preferably between 620° C. and 635° C. The time duration of the sintering process measured within a temperature between 575° C. and 650° C. is preferably between 30 minutes and 2 hours, most preferably between 40 minutes and 1 hour. The reducing atmosphere is preferably realized by a H2 protected furnace.

In a further preferred version the reducing atmosphere during the hot pressing process and/or the sintering process is a forming gas such as (but not restricted to) $2NH_3$. An exemplary, (but not restricting) reaction is $2NH_3 \rightarrow 3H_2+N_2$.

A welding process is preferred for establishing the electrical contact between the anode electrode and each capacitor slug anode, especially spot welding or gas tungsten arc welding. Spot welding or resistance welding as well as gas tungsten arc welding or tungsten inert gas welding are well known in the art, and will not be discussed in detail in this document.

It should also be understood that combinations of the foregoing parameters can be useful.

Also in a preferred version the anodization of the aluminum slug anode includes forming of an aluminum oxide layer (dielectric) in a boric acid-ammonium water type solution. The thickness of the oxide layer is nearly proportional to the forming voltage, with a proportional factor of about 0.0013 micrometer/V to 0.0015 micrometer/V.

In a preferred version the method of producing an anodized aluminium slug anode for a capacitor includes anodization of the aluminium slug anode having an energy density capability of between 4 joules/cc of slug to 8 joules/cc. Even more preferred is an energy density capability of between 5 joules/cc of slug to 6 joules/cc.

In a preferred version the method of producing an aluminum slug anode for a capacitor uses etched aluminum foils having an effective surface area between 4000 $cm^2$/cc to 9000 $cm^2$/cc, preferably between 4400 $cm^2$/cc to 8900 $cm^2$/cc. Even more preferred is an effective surface area between 5500 $cm^2$/cc and 6700 $cm^2$/cc. The effective surface area is measured using a BET surface analysing instrument, as discussed above.

Since a homogenously distributed effective surface area is preferred for the manufacturing process, it casing be favourable to use different degrees of porosity for different layers of the multi-layer stack of aluminum foils, or even porosity gradients within a single aluminum foil and/or within the different stack layers. These gradients of porosity and/or effective surface area can optimize the wetting of the slug anode with the electrolyte, and/or improving the electrical conducting efficiency between cathode electrode, electrolyte, and Aluminium oxide dielectric. Additionally, the porosity gradients and/or effective surface area gradients are adapted to improve the conducting and/or welding properties for electrically contacting the slug anode.

Another aspect of the invention is a slug anode formed from etched aluminum foils, which are stacked to a multi-layer stack, hot pressed, sintered and finally anodized.

A further aspect of the invention is a method of producing a capacitor with an aluminum slug anode wherein the anode is placed in a separator paper into a casing with a cathode foil or in a casing with the casing being the cathode itself. The anode and cathode are connected with electrical feedthroughs. The anode, the separator paper and the cathode are impregnated with an electrolyte, the interior of the case is filled with the electrolyte, and the case is sealed. Sealing of the case can be accomplished by several methods known in the art, such as a welding process, preferably a laser welding process.

The invention also involves a capacitor which includes one or more aluminum slug anodes formed from etched aluminum foils, which are stacked to a multi-layer stack, hot pressed, sintered, and finally anodized.

Another aspect of the invention is an implantable medical device including one or more capacitors, which include aluminum slug anodes formed from etched aluminum foils, which are stacked to a multi-layer stack, hot pressed, sintered, and finally anodized.

BRIEF DESCRIPTION OF THE DRAWINGS

Some aspects of the invention are schematically illustrated in the accompanying drawings, wherein.

DETAILED DESCRIPTION OF THE INVENTION

Figure 1A:
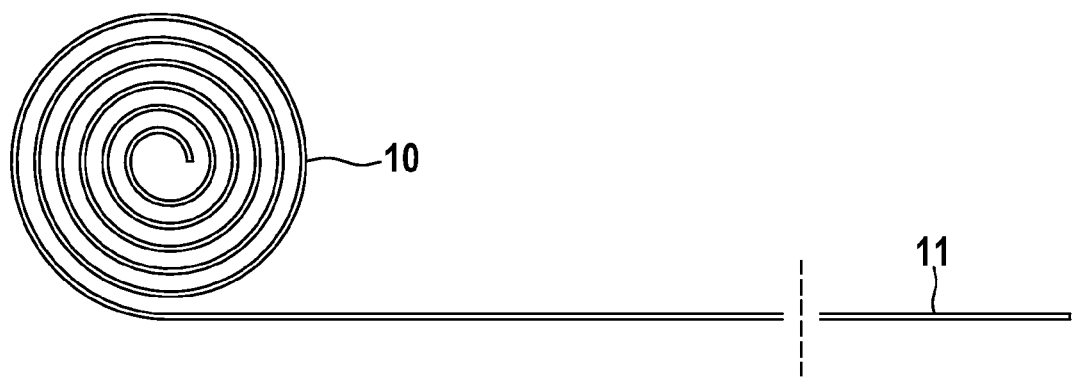
FIG. 1a depicts a rolled etched aluminum foil from which a sheet is formed.
Figure 1B:
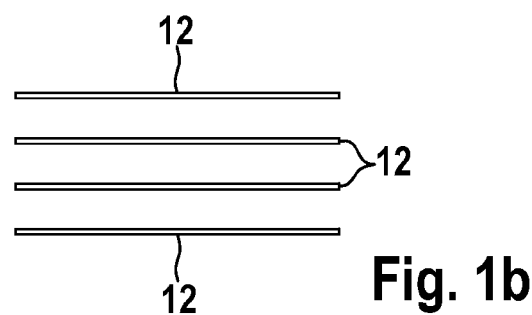
FIG. 1b depicts a multi-layer stack of etched aluminum foils.
Figure 2A:
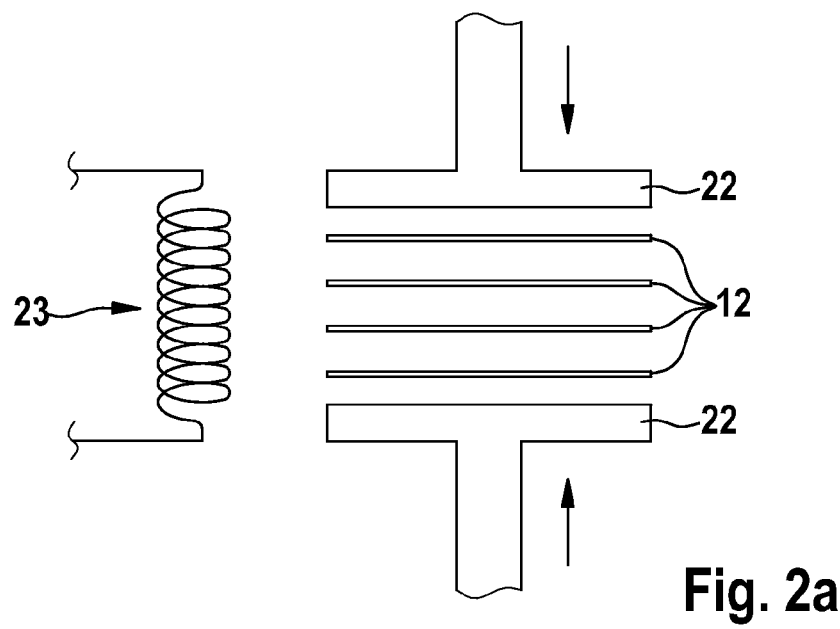
FIG. 2a depicts equipment for a hot pressing process.
Figure 2B:
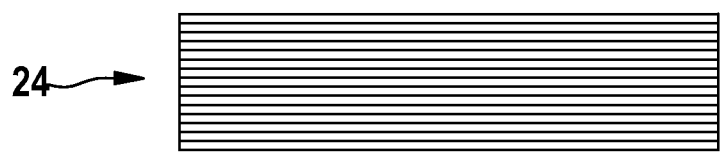
FIG. 2b depicts a hot pressed multiple-layer stack of etched aluminum foils.
Figure 3:
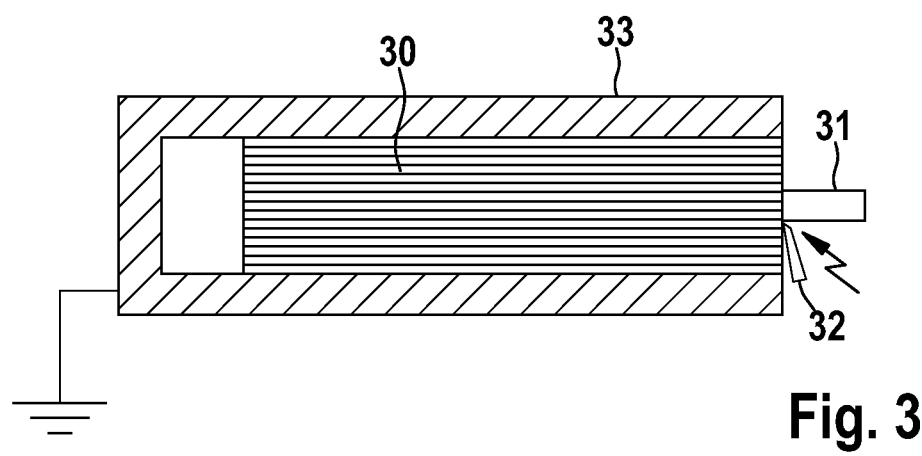
FIG. 3 depicts providing an attachment as means for electrically contacting an aluminum slug anode.

A preferred method for producing aluminum slug anodes starts with the use of etched aluminum foils, which can be purchased ready-made, or etched by known processes like electrochemical etching with a chloride solution. The etched aluminum foil 10 shown in FIG. 1a is then cut into handy pieces 11 of roughly or precisely the size of the later aluminum slug anode, as shown schematically in FIG. 1a. These pieces are then assembled to a multi-layer stack 12, like in FIG. 1b. The multi-layer aluminum stack is then hot pressed at a temperature between 350° C. and 500° C., preferably between 390° C. and 410° C., and with a pressure applied between 20 MPa and 40 MPa, preferably 25 MPA to 30 MPa, for a duration of between 1 minute to 10 minutes, preferably between 2 minutes and 3 minutes. The application of pressure should be started when the desired target temperature has been reached and stabilized. The complete hot processing is done in a reducing atmosphere. In FIG. 2a a multi-layer aluminum stack 12 is shown in a hot pressing setup with the pressing tool 22 and a heating 23. FIG. 2b shows a schematic view of the hot pressed multi-layer aluminum stack, already having the final size of the later slug anode. The hot pressing procedure is followed by a sintering process in a reducing atmosphere like in a H2 furnace. The temperature for the sintering process is between 575° C. and 650° C., preferably between 620° C. and 635° C. The time duration of the sintering process measured at a temperature between 575° C. and 650° C. is between 30 minutes and 2 hours, preferably between 40 minutes and 1 hour. After the sintering process, the pressed and sintered aluminum slug anode is cut to the desired precise form, if not done so earlier. Furthermore the electrical contact between the anode electrode and each capacitor slug anode has to be established, preferably by a welding process like spot welding or gas tungsten arc welding. An example is shown in FIG. 3, which illustrates joining an electrically conducting attachment 31 to an aluminum slug anode 30 by a spot welding process utilizing a welding electrode 32 and welding tongs 33. In a last step the aluminum slug anode is anodized, preferably in a boric acid-ammonium water type solution and under application of a voltage proportional to the desired oxide thickness.

Figure 4A:
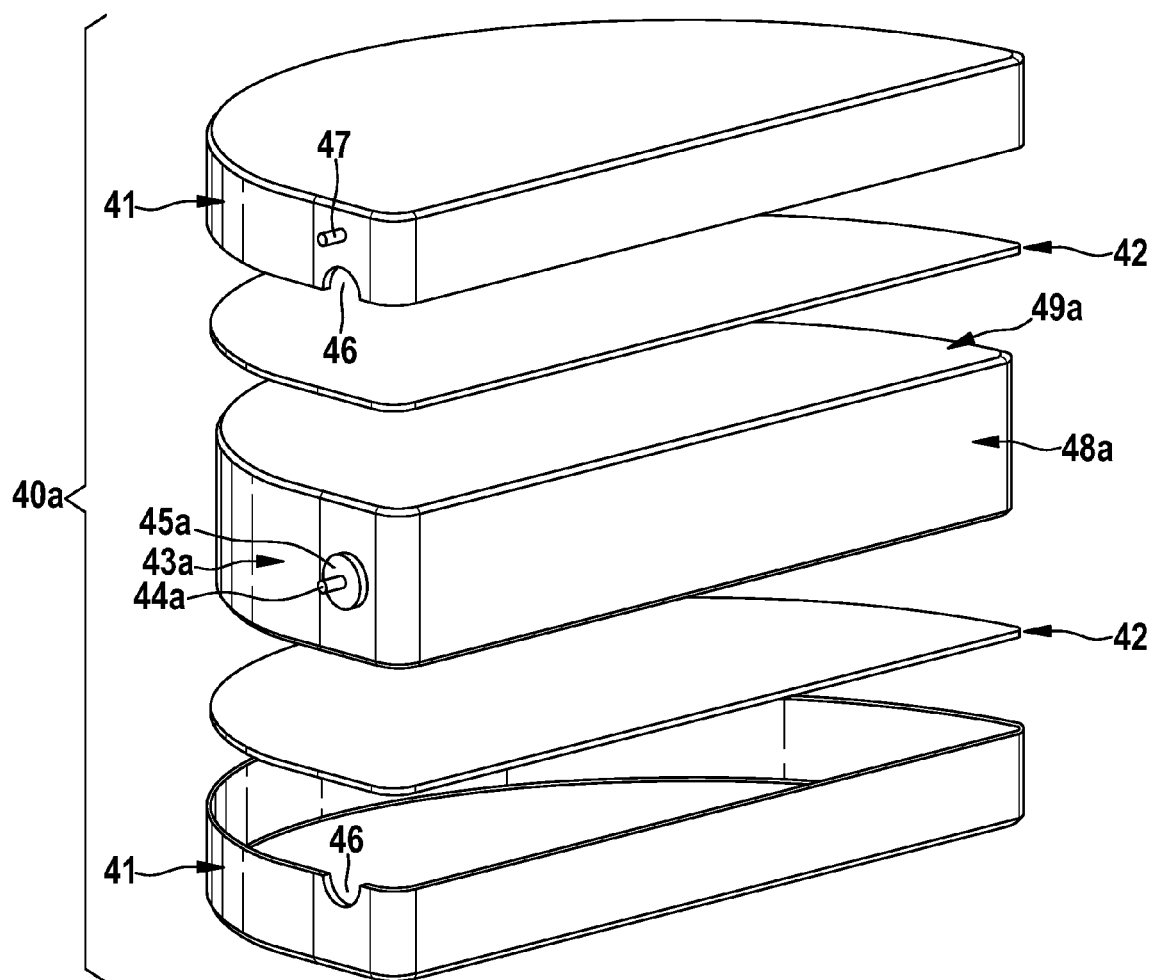
FIG. 4a depicts assembly of a capacitor with an aluminum slug anode.
Figure 4B:
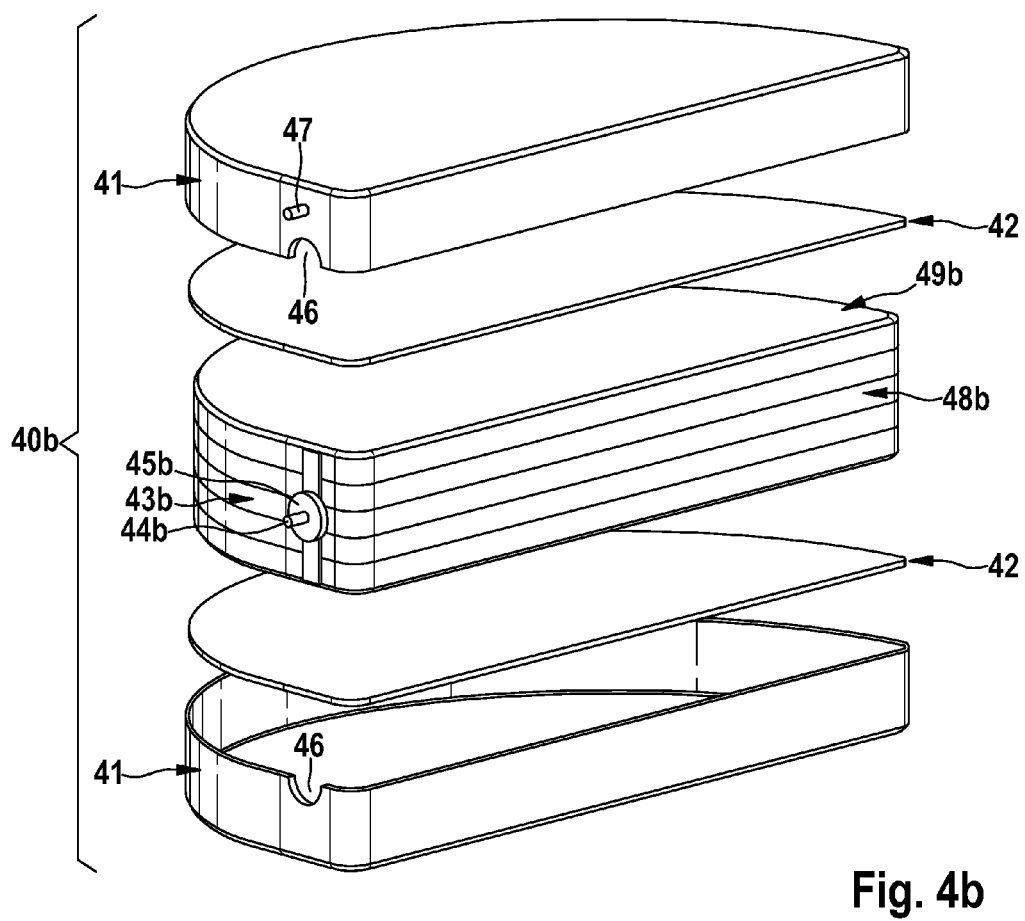
FIG. 4b depicts an assembly of a capacitor with multiple slug anodes.

The assembly of a capacitor 40a and 40b utilizing the anodized slug anode is shown in FIGS. 4a and 4b. While FIG. 4a illustrates the assembly using a single anodized aluminum slug anode 43a, FIG. 4b illustrates the assembly using anodized multiple aluminum slug anode 43b. For the capacitor assembly, the anode slug 43a is wrapped in separator paper 42 and then placed in a casing 41', preferably an aluminum casing. This casing acts as the cathode of the capacitor, and includes a contact 47 and a hole 46, which forms a feedthrough in combination with the contact of the anode 44a (and an insulator 45a) after sealing the capacitor. The capacitor 40b in FIG. 4b is assembled similarly to the assembly of the capacitor 40a in FIG. 4a. The anodized multiple slug anode 43b is wrapped in separator paper 42 and then placed in a casing 41', preferably an aluminum casing. This casing acts as the cathode of the capacitor, and includes a contact 47 and a hole 46 which forms a feedthrough in combination with the contact of the anode 44b and an insulator 45b after sealing the capacitor. The slug anodes of the multiple slug anode can be separated by an insulator, like paper, and/or a cathode foil, preferably an aluminum cathode foil, or combinations of these (which can lead to a layer of insulator, cathode foil, insulator, etc.).

The anode slug or the multiple anode slug can be wrapped into the separator paper in different ways, such as having the anode slug or multiple anode slug enclosed completely by the separator paper, or having the separator paper covering only the flat upper 49a and 49b surface and bottom surface but not the lateral area 48a and 48b.

The sealed capacitor can be used as known in the art in implantable devices, especially in defibrillators or cardioverters-defibrillators.

A person skilled in the art will understand that any combinations of the previous components/structures and steps may be used, and the listed versions shall not limit the scope of the invention. It will also be apparent to those skilled in the art that numerous modifications and variations of the described examples and versions are possible in light of the foregoing discussion. The disclosed examples and versions are presented for purposes of illustration only. Therefore, it is the intent to cover all such modifications and alternate versions as may come within the true of the claims below.

What is claimed is:

1. A method of producing an aluminum slug anode for a capacitor, the method including the steps of:
   a. stacking etched aluminum foils into a multi-layer stack,
   b. hot pressing the multi-layer stack of aluminum foils,
   c. sintering the pressed multi-layer stack of aluminum foils, and
   d. anodizing the multi-layer stack of joined aluminum foils.

2. The method of claim 1 further including the step of cutting the aluminum foils to a desired area, whereby the anodized multi-layer stack of joined aluminum foils has at least substantially the desired area.

3. The method of claim 2 wherein the cutting step occurs prior to one or more of the pressing and sintering steps.

4. The method of claim 2 wherein the cutting step occurs after the sintering step.

5. The method of claim 1 wherein the hot pressing step occurs at a temperature between 350° C. and 500° C.

6. The method of claim 5 wherein the hot pressing step is performed for 1 to 10 minutes.

7. The method of claim 5 wherein the hot pressing step is performed for 2 to 3 minutes.

8. The method of claim 1 wherein the hot pressing step occurs at a temperature between 390° C. and 410° C.

9. The method of claim 1 wherein the hot pressing step occurs at a pressure between 20 MPa and 40 Mpa.

10. The method of claim 1 wherein the hot pressing step occurs at a pressure between 25 MPa and 30 MPa.

11. The method of claim 1 wherein the sintering step occurs at a temperature between 575° C. and 650° C.

12. The method of claim 11 wherein the sintering step is performed between 30 minutes and 2 hours, preferably between 40 minutes and 1 hour.

13. The method of claim 11 wherein the sintering step is performed between 40 minutes and 1 hour.

14. The method of claim 1 wherein the sintering step occurs at a temperature between 620° C. and 635° C.

15. The method of claim 1 wherein the sintering step is performed in a reducing atmosphere.

16. The method of claim 1 wherein the sintering step is performed in a primarily hydrogen atmosphere.

17. The method of claim 1 wherein at least one of the hot pressing step and the sintering step is performed in an atmosphere primarily formed of:
   a. hydrogen, or
   b. a forming gas.

18. The method of claim 1 wherein the hot pressing step is performed in a reducing atmosphere.

19. The method of claim 1 wherein the step of anodizing the multi-layer stack of joined aluminum foils includes exposing the foils to a solution of boric acid and ammonium water to form an aluminum oxide layer.

20. The method of claim 1 wherein the anodized multi-layer stack of joined aluminum foils has an effective surface area between 4000 cm2/cc to 9000 cm2/cc.

21. The method of claim 1 wherein the anodized multi-layer stack of joined aluminum foils has an effective surface area between 4400 cm2/cc to 8900 cm2/cc.

22. The method of claim 1 further including the step of forming a contact in electrical communication with the aluminum foils within the multi-layer stack.

23. The method of claim 22 wherein the contact is formed by welding together aluminum foils within the multi-layer stack.

24. The method of claim 1 further including the step of electrochemically etching aluminum foils, thereby forming the etched aluminum foils.

25. The method of claim 1 further including the steps of:
   a. situating the anodized multi-layer stack of joined aluminum foils within the interior of a casing, with a contact in electrical communication with the joined aluminum foils being exposed from the exterior of the casing;
   b. filling the interior of the casing with electrolyte, and
   c. sealing the casing about the joined aluminum foils and electrolyte.

26. The method of claim 25 wherein the anodized multi-layer stack of joined aluminum foils is at least partially surrounded by separator paper within the casing.

27. The method of claim 25 wherein the anodized multi-layer stack of joined aluminum foils is at least partially surrounded by foil within the casing.

28. A capacitor including one or more anodized multi-layer stacks of joined aluminum foils formed by the method of claim 1.

29. An implantable medical device including one or more of the capacitors of claim 28.

30. The implantable medical device of claim 29 wherein the implantable medical device includes one or more of:
   a. a cardioverter, and
   b. a defibrillator.

* * * * *